(12) United States Patent
Zhu

(10) Patent No.: US 8,704,641 B2
(45) Date of Patent: Apr. 22, 2014

(54) METHOD AND COMMUNICATION SYSTEM FOR CONTROLLING COMMUNICATION DISTANCE OF RF SIM CARD WITH THE AID OF TAG IDENTIFICATION

(75) Inventor: Shan Zhu, Nanshan District (CN)

(73) Assignee: Nationz Technologies Inc., Shenzhen (CN)

( * ) Notice: Subject to any disclaimer, the term of this patent is extended or adjusted under 35 U.S.C. 154(b) by 429 days.

(21) Appl. No.: 13/059,620

(22) PCT Filed: Sep. 23, 2009

(86) PCT No.: PCT/CN2009/074141
§ 371 (c)(1),
(2), (4) Date: May 3, 2011

(87) PCT Pub. No.: WO2010/022687
PCT Pub. Date: Mar. 4, 2010

(65) Prior Publication Data
US 2011/0227707 A1 Sep. 22, 2011

(30) Foreign Application Priority Data
Sep. 23, 2009 (CM) .................. 2008 1 0142182

(51) Int. Cl.
*H04Q 5/22* (2006.01)
*G05B 19/00* (2006.01)
*H04B 7/00* (2006.01)
*H04B 1/38* (2006.01)
*G06K 7/06* (2006.01)
*G06F 17/00* (2006.01)

(52) U.S. Cl.
USPC .................. 340/10.4; 340/10.41; 340/10.51; 340/10.2; 340/5.6; 455/519; 455/558; 455/41.2; 235/441; 235/375

(58) Field of Classification Search
CPC ............. H04M 1/7253; H04M 1/727; H04M 2250/14; H04M 2250/04; H04M 11/00; H04M 12/00; H04W 12/00; H04W 12/06; H04W 12/12; G06K 2007/10534; G06K 7/0004; G06K 7/0095; G06K 7/10217; G06K 7/10237; G06K 7/10108
USPC .............. 340/10.4, 10.2, 10.51, 572.1, 10.33, 340/5.6, 572.6, 539.32, 568.1; 455/519, 455/558, 41.2, 550.1, 344, 557, 90, 466, 455/41.1, 552.1, 572, 411; 379/207.01, 379/211.01, 144, 220.01, 88.16; 235/375, 235/435, 492, 441
See application file for complete search history.

(56) References Cited

U.S. PATENT DOCUMENTS

| | | | |
|---|---|---|---|
| 6,538,564 B1 * | 3/2003 | Cole | 340/10.4 |
| 6,728,553 B1 * | 4/2004 | Lehmus et al. | 455/558 |
| 7,679,514 B2 * | 3/2010 | Rofougaran et al. | 340/572.2 |
| 2002/0183094 A1 * | 12/2002 | Seita | 455/558 |
| 2005/0162256 A1 * | 7/2005 | Kinoshita | 340/10.41 |
| 2006/0040692 A1 * | 2/2006 | Anttila et al. | 455/519 |
| 2007/0096883 A1 * | 5/2007 | Kim | 340/10.51 |
| 2007/0213096 A1 * | 9/2007 | Bella et al. | 455/558 |
| 2007/0254712 A1 * | 11/2007 | Chitti | 455/558 |
| 2008/0099559 A1 * | 5/2008 | Lo et al. | 235/441 |
| 2009/0088077 A1 * | 4/2009 | Brown et al. | 455/41.2 |
| 2009/0093272 A1 * | 4/2009 | Saarisalo et al. | 455/558 |
| 2010/0019887 A1 * | 1/2010 | Bridgelall et al. | 340/10.2 |
| 2010/0205425 A1 * | 8/2010 | Takacs et al. | 713/100 |
| 2012/0001725 A1 * | 1/2012 | Chen | 340/5.6 |

FOREIGN PATENT DOCUMENTS

| | | |
|---|---|---|
| CN | 1933351 A | 3/2007 |
| CN | 101035336 A | 9/2007 |
| CN | 101114901 A | 1/2008 |
| CN | 101354739 A | 1/2009 |
| WO | WO 2005104584 A1 * | 11/2005 |

OTHER PUBLICATIONS

International Search Report PCT/CN2009/074141 dated Dec. 22, 2009.

* cited by examiner

*Primary Examiner* — Jennifer Mehmood
*Assistant Examiner* — Mirza Alam
(74) *Attorney, Agent, or Firm* — Foley & Lardner LLP; Stephen A. Bent

(57) ABSTRACT

A method and RF SIM card communication system using a tag recognition to control the RF communication range, a tag for providing data information is installed on a mobile communication terminal equipped with an RF SIM card, a tag reader module for reading out and transmitting the data information is installed on an RF card reader device, setting a card reading condition for the card reader device as: under the condition that the tag reader module reads out the tag data information, the RF card reader module, based on the data information of the tag, establishes wireless communication link with and transfers data to the RF SIM card in the mobile terminal. The present invention is not affected by the shielding effect of the mobile communication terminal, thereby avoids the cumbersome calibration process for the RF SIM card transceiver power and receiver sensitivity in existing technologies, this both brings convenience to the users, and further facilitates of widespread use of RF SIM cards.

18 Claims, 3 Drawing Sheets

US 8,704,641 B2

METHOD AND COMMUNICATION SYSTEM FOR CONTROLLING COMMUNICATION DISTANCE OF RF SIM CARD WITH THE AID OF TAG IDENTIFICATION

CROSS-REFERENCE TO RELATED APPLICATIONS

This application is the U.S. National Phase of PCT/CN2009/074141 filed Sep. 23, 2009; which claims priority from Chinese Patent Application No. 200810142182.0 filed Aug. 25, 2008. The subject matter of each of the above-reference applications is incorporated in entirety by reference.

TECHNICAL FIELD

The present invention involves radio frequency (RF) wireless communication system and its realization method, particularly those involving RF SIM card used in a mobile communication terminal, specifically short-range wireless communication system and its realization method involving RF SIM card for controlling an RF communication range.

BACKGROUND TECHNOLOGY

Subscriber Identity Model, abbreviated as SIM card, in existing mobile communication technologies are widely used in mobile communication terminals. Following development in technologies, various methods are employed in conventional mobile terminals, first to add various intelligent circuit modules into the SIM card of common mobile communication terminals, making the SIM cards not only having basic SIM card functions, but also added other functions that are more pertinent to daily life. RF SIM card is one of these. Chinese patent application No. 200710124354.7 disclosed technologies related to an RF SIM card. RF SIM cards adopt active RF technologies, allowing common SIM cards, with minor modifications, to have the functionalities of mobile payment such as electronic wallets, or access control and other consumer applications.

The RF SIM cards in some applications, for example when using the RF SIM cards as public transit fare IC cards and other RF smart cards, to avoid the phenomena of false reading and erroneous reading of the card, the communication range between the RF SIM card and the RF card reader must be controlled to within a very small range. Thus, the above described communication range control becomes the most important realization difficulty for RF SIM card wireless communication system. Existing technologies utilize the decay of the RF SIM card signal strength to control the wireless communication range between the RF SIM card and the RF card reader. However, RF SIM cards typically are assembled inside mobile communication terminals, and are affected by the shielding effect of the mobile communication terminals. For the same wireless transceiving power of the RF SIM cards being deployed, the RF signals would have different transceiving powers through different types of mobile communication terminals. Thus, it is necessary to build different RF SIM cards with different wireless transceiving powers for different types of mobile communication terminals to control their respective wireless communication ranges to within an appropriate range. This subsequently requires that, before using the RF SIM cards, the users must calibrate the wireless transceiving power of the RF SIM cards according to the types of the mobile communication terminals. In addition, if a user replaces the mobile communication terminal, after each replacement it is necessary to calibrate the RF SIM card again with respect to the wireless transceiving power. This tedious calibration process not only makes the user feel inconvenient, but also does not facilitate the wide applications of the RF SIM cards.

CONTENT OF THE INVENTION

The present invention curies the deficiencies in of existing technologies, and proposes a method for controlling, with the aid of tag identification, the communication range between RF SIM card and RF card reader devices, and RF communication system adopting the method. The method and system are consistent with the requirements of short-range wireless communication, and also avoid the trouble to the user that the RF SIM card must be calibrated. Identification tags are generally used for the identification of goods, inventory and tracking, etc., and are widely used in retail, manufacturing units, packaging sector and logistics transportation and other industries. Radio Frequency Identification technologies, abbreviated as RFID technology, and bar code technology are the main applications of identification tag recognition technologies.

The present invention can solve the technical problems described in the following technical solutions to:

With the implementation of an identification tag to control range of the RF SIM card communication method, based on the SIM card communication system, the RF communication system including a mobile communication terminal equipped with the RF SIM card, and radio frequency reader module included in the RF card reader device; particularly the method comprises the following steps:

A. In the mobile communication terminal equipped with the RF SIM card, implementing at least one tag to provide data information;

B. In the RF card reader device, implementing a tag reading module, the tag reader module reading and transmitting data information provided in the tag;

C. Setting the card reading condition for the RF card reader device, that is, only under the condition that the tag reader module reads out the tag data information, the RF card reader module, according to the tag data information, establishes wireless communication link with and transmit data to the RF SIM card in the mobile communication terminal.

To ensure that the RF SIM card and the RF card reader module, in the data transmission process, are always in the effective range of wireless communications, in step C, in the data transmission process between the RF SIM card and the RF card reader module, the tag reader module intermittently read the tag data information, to ensure that the RF SIM card is in a specified communication range.

The data information provided by the tag includes RF communication address of the RF SIM card in the mobile communication terminal equipped with the tag.

The tag providing the data information can be adhered to a shell surface of the mobile communication terminal.

The present invention's solution to the technical problems described above can also be implemented using the following technical solutions:

Design and manufacture an RF SIM card communication system using a tag recognition to control the RF communication range, including mobile communication terminals equipped with the RF SIM cards, and RF card reader devices having RF card reader modules disposed therein; in particular, the mobile communication terminal is equipped with at least one tag to provide data information; said RF reader device having a tag reader module, the tag reader module reading and transmitting the data information of the tag; controlled by the RF reader device, after the tag reader module reads out the tag data information, said RF card reader module, based on the data information of the tag, establishes wireless communication link with and transfers data to the corresponding RF SIM card.

The tag providing data information is fixed to the shell surface of the mobile communication terminal, or set in the mobile communication terminal at a location for the tag reader module to easily read.

The tags and tag reader module can use the following devices: first, the tags are RFID modules, and the tag reader modules are RFID reader modules; second, the tags are bar code labels, and the tag reader modules are bar code reader modules; third, the tags are contactless smart cards, and the tag reader modules are contactless smart card reader modules.

In addition, the RF SIM cards and RF card reader modules have working frequencies in the super high frequency (SFH), very high frequency (VHF), or ultra high frequency (UHF) bands.

Compared with the existing technologies, the present invention, "Method and System for Controlling RF SIM Card Communication Range Using ID Tag," the beneficial effects lie in:

1. Using tag identification technologies to accurately control the wireless communication range between mobile communication terminals equipped with the RF SIM cards and RF card readers, no need to perform any special setting and calibration for the wireless transmission power and receiver sensitivity of the RF SIM cards and RF card readers, the application is simple and easy;

2. Tag recognition technology is a widely used, mature technology. Using the tag recognition technology to control the RF wireless communication range is not affected by the mobile terminals' RF shielding effects, and overcomes the difficulties of existing wireless communication technologies where the communication range is affected by different types of mobile communication terminals;

3. So that the user during the use does not need any calibration and setup, even if there is the case of replacing the mobile communication terminals, there is only the need to move the tag to the new mobile communication terminal, not only brings convenience to the users but also promotes the spread of the radio RF SIM cards.

SPECIFIC REALIZATION METHODS

Specific embodiments are described in detail below with reference to the attached drawings.

Figure 1:
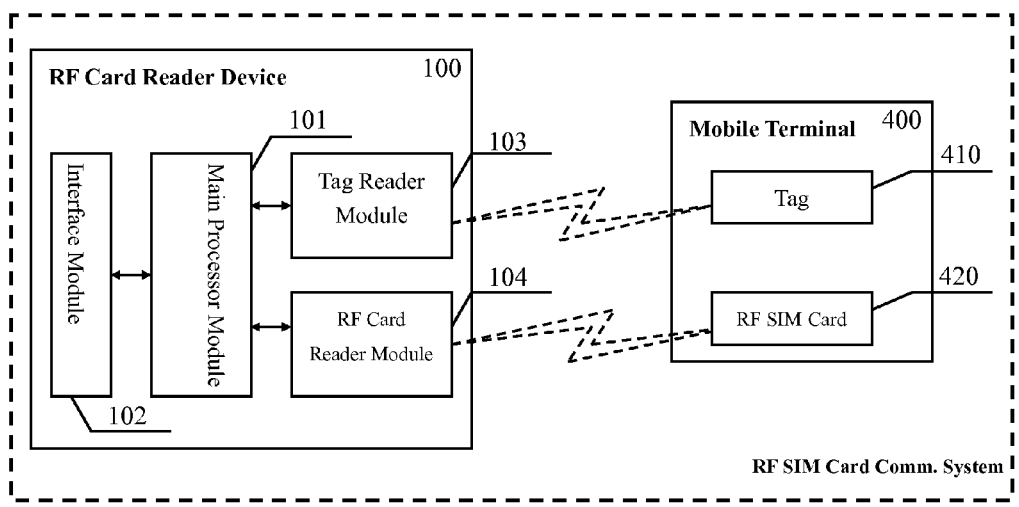
FIG. 1 is the electrical principle block diagrams according to a first preferred embodiment of the invention, using tag identification, to control the RF communication range of the RF communication system.
Figure 2:
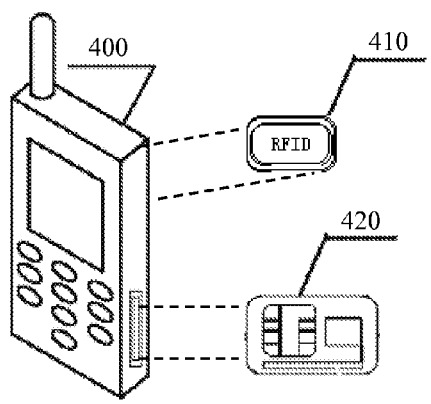
FIG. 2 is a configuration diagram, according to the first preferred embodiment, of a mobile communication terminal 400.
Figure 3:
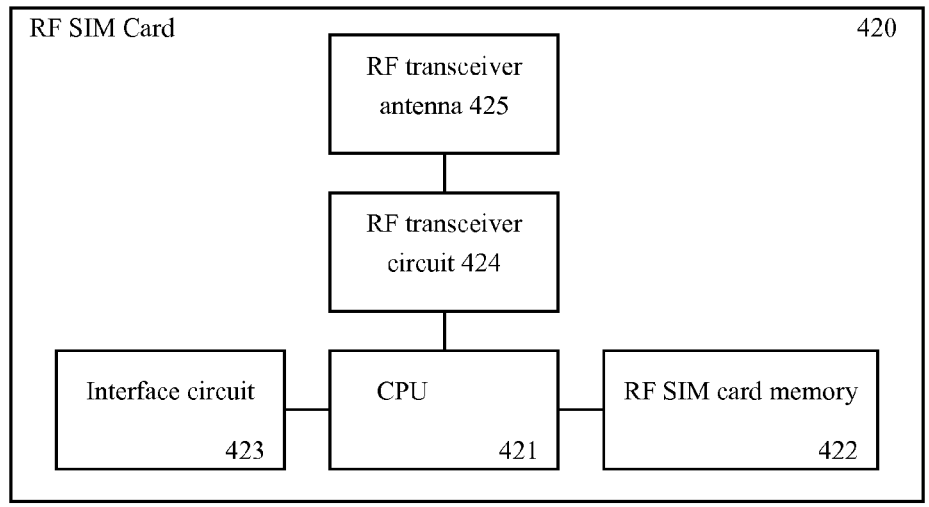
FIG. 3 is a electrical principle block diagram, according to the first preferred embodiment, of a SIM card 420.

The present invention relates to using tag identification to control the RF communication range of the RF SIM card communication system, as shown in FIG. 1, in a first preferred embodiment of the invention, the RF communication system includes a mobile communication terminal equipped with an RF SIM card 420, and RF reader device 100. The RF reader device 100 includes the main processor module 101, interface module 102, and RF reader module 104; as shown in FIG. 3, disposed in the mobile communication terminal 400, the RF SIM card 420 includes the central processor 421, RF SIM card memory 422, interface circuit 423, RF transceiver circuitry 424 and RF transceiver antenna 425. The RF SIM card 420 and RF reader device 100, in the control of their respective central processors 421 and the main control processor module 101, can establish the RF wireless communication link and transfer data. A characteristics of the present invention is that, as shown in FIG. 1 and FIG. 2, the mobile communication terminal 400 is equipped with at least tag 410 for providing data information; the RF reader device 100 is equipped with a tag reader module 103, the read module 103 can be used for the collection and transfer the data information of the data tag 410; controlled by the RF reader unit 100, after the tag reader module 103 receives the data information of the tag 410, the RF card reader module 104, according to the data information of tag 410, establishes with the RF SIM card 420 a wireless communication link and transfer data. The invention utilizes tag recognition technologies, already widely used in other areas, to control the communication range of the RF SIM card wireless communication system, the RF card reader device 100 takes that the tag reader module 103 identifies tag 410 as a prerequisite to establish wireless communication link and transfers data between RF SIM card 420 and RF card reader module, because only within a certain distance, the tag reader module 103 can identify tag 410 and read and transmit the data information provided by tag 410, so the RF SIM card communication system can accurately limit the wireless communication range between the RF SIM card 420 installed in the mobile communication terminal 400 and RF reader device 100.

A first preferred embodiment of the invention, as shown in FIG. 2, the tag 410 for providing the data information is fixed to the mobile communication terminal 400 at the shell surface. Of course, the tag 410 can also be set on the mobile communication terminal 400 at any locations where it can be conveniently read by the read module 103.

The tag 410 and tag reader module 103 can use a variety of specific devices, the first preferred embodiment of the invention, as shown in FIG. 2, the tag 410 is an RFID tag module, and the tag reader module 103 is an RFID reader module. In addition, tag 410 can also be a bar code label, then the tag read module 103 is a bar code label reader module; or, tag 410 is a contactless smart card, then the tag reader module 103 is a contactless smart card reader access module.

The first preferred embodiment of the invention, the RF SIM card 420 and RF card reader module 140 have working frequency bands including the SHF, VHF, or UHF bands.

The invention also involves a method using tag identification to control the communication range of the RF SIM card, based on RF SIM card communication system described above, that is, the RF SIM card communication system includes a mobile communication terminal 400 equipped with an RF SIM card 420, and includes the RF read device 100 having a built-in RF card reader module 104; as shown in FIG. 1 and FIG. 2, said method comprising the following steps:

A. Setting at least one identification tag 410, used for providing data information, to the mobile communication terminal 400 equipped with the RF SIM card 420;

B. Setting tag reader module 103 in the RF reader device 100, the tag reader module 103 is used for collecting and transmitting the data information of the identification tag 410;

C. Setting the card reading condition for the RF card reader device 100, that is, under the condition the tag reader module 103 reads out the data information of the identification tag 410, the RF card reader module 104 can, according to the data information of the identification tag 410, establish a wireless communication link with and transfer data to the RF SIM card 420.

Figure 4:
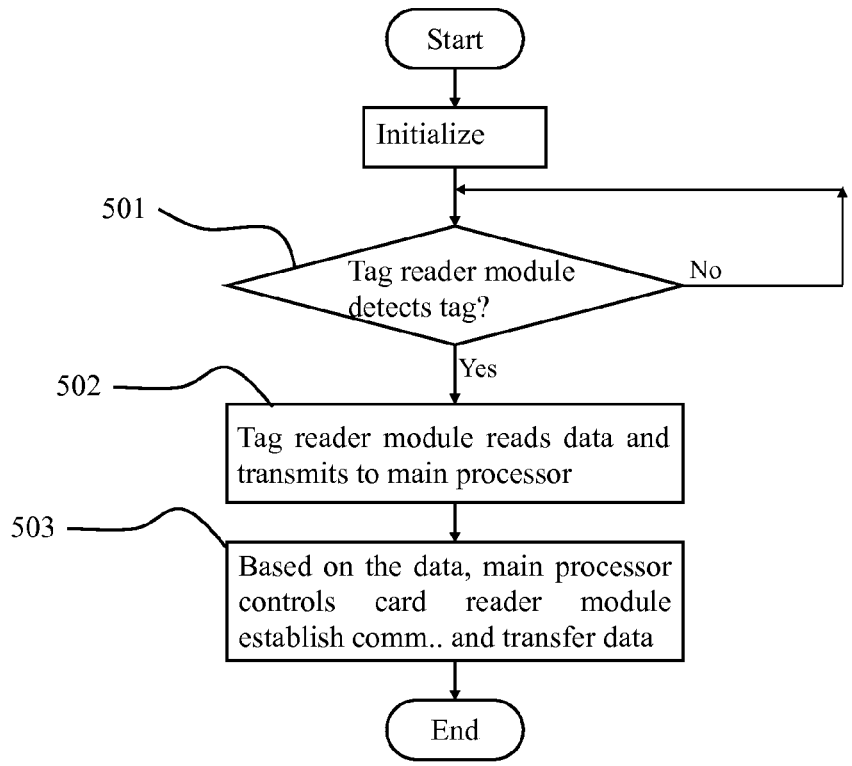
FIG. 4 is a card reading flowchart, according to the first preferred embodiment, of the RF reader device.

The RF card reader device 100 in the Step C above has its card reading flowchart illustrated in FIG. 4, after the RF card reader device 100 powers up and initializes, entering step 501, and periodically queries whether the tag reader module 103 identifies the corresponding tag 410; after said identification tag reader module 103 identifies the corresponding tag 410, steps 502 and 503 are sequentially executed, that is, the tag reader module 103 reads the data information provided by the tag 410 and transmits the data information to the main processing module 101, then the main processing module 101 controls the RF reader module 104, according to the data information of the tag 410, establishes with the RF SIM card 420 a wireless communication link and transfers data, thus completing the RF SIM card corresponding function.

The first preferred embodiment the present invention, the data information provided by the tag 410 includes RF SIM card 420 RF communication address of the mobile communication terminal 400, the main processor module 101, according to the RF communication address of the RF SIM card 420 provided by tag 410, makes the RF card reader module 104 and the RF SIM card 420 establish a wireless communication link.

The first preferred embodiment the present invention, as shown in FIG. 2, the tag 410 is fixed, by way of adhesion, to the shell surface of the communication terminal 400.

Figure 5:
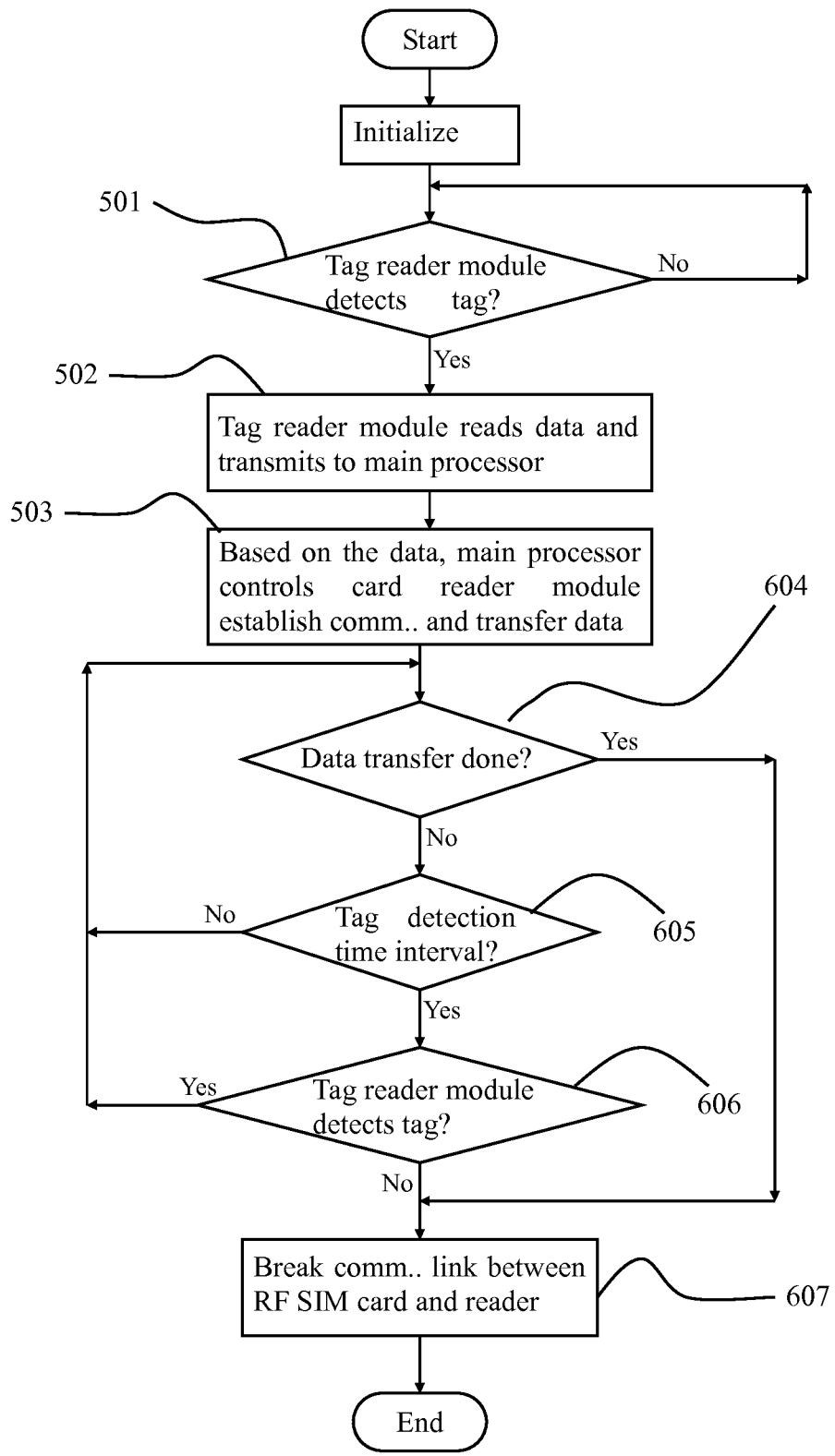
FIG. 5 is a card reading flowchart, according to a second preferred embodiment, of the RF reader device.

As shown in FIG. 5, the second preferred embodiment of the invention and the preferred embodiment has the difference that in the above step C adding the following steps: in the process of transferring data between the RF SIM card 420 and the RF card reader module 420, the tag reader module 103 intermittently reads the data information of the tag 410, to ensure that RF SIM card 420 is within a specified communication range. Also as shown in FIG. 5, the second embodiment of this invention adds steps in step C specifically steps 604-607: after the RF reader module 104 starts data transfer with RF SIM card 420, executing step 604, detecting whether the data transfer is complete, if the data transfer is completed then execute step 607, disconnecting the wireless communication link between the card reader module 104 and the RF SIM card 420; if the data transfer has not been completed, execute step 605. Step 605, the process is essentially to set in the reading apparatus an interval of time, for the tag reader module 103 to detect intermittently whether the tag 410 can be identified, that is step 606, if the tag read module 103 can detect the tag 410, it indicates that the mobile communication 400 equipped with the RF SIM card 420 and the RF card reader device 100 are still within allowed wireless communication range, thus return to step 604, completing a communication range detection period; if the tag reader module 103 cannot detect the tag 410, it indicates that the mobile communication terminal 400 equipped with the RF SIM card 420 and the RF reader device 100 have been out of the allowed range of wireless communication, in order to avoid misreading and erroneously reading the card, even if the RF card reader module 104 can still conduct data transmission with the RF SIM card 420, it must disconnect the wireless communication link between the RF card reader module 104 and the RF SIM card 420, that is, directly execute step 607. In the second preferred embodiment of the invention, in step 606 when the tag reader module 103 cannot detect the tag 410, the steps that can be executed are not limited to disconnecting the wireless link as described in step 607, according to real need other steps such as warning or indication can be executed. The second preferred embodiment of the invention more effectively ensures that the mobile communication terminal, equipped with the RF SIM card 420 communication and the RF card reader device 100, is always in the allowed wireless range in the process of data transfer, further to prevent the phenomena of misreading and erroneously reading the card.

From different models of mobile communication terminals, the present invention is not affected by the shielding effect of the mobile communication terminal to the RF SIM card on transmission signal power and receiver sensitivity, thereby avoids the cumbersome calibration process for the RF SIM card transceiver power in existing technologies, both for the convenience of the users, and further for the promotion of widespread use of RF SIM cards.

The invention claimed is:

1. A method of wireless communication between a radio frequency (RF) card reader and a mobile terminal, wherein the mobile terminal comprises an RF card and a tag, and the RF card reader comprises a tag reader to read data information from the tag, an RF reader module, and a main processor module, the method comprising:
determining, by the main processor module using the tag reader, that the mobile terminal is within a communication range with the RF card reader by reading and receiving the data information from the tag of the mobile terminal;
establishing, by the RF card reader, a communication link with the mobile terminal based on the data information received from the tag of the mobile terminal;
controlling, by the main processor module, the RF reader module to exchange RF data with the RF card of the mobile terminal;
detecting, intermittently during the RF data exchange between the RF reader module and the RF card, by the main processor module using the tag reader, whether the mobile terminal is still within the communication range with the RF card reader by reading the data information from the tag of the mobile terminal; and
disconnecting, by the RF card reader, the communication link with the mobile terminal when the mobile terminal is not within the communication range with the RF card reader or when the RF data exchange has completed.

2. The method of claim 1, wherein:
the tag is configured to:
determine a communication range between the RF card reader and the mobile terminal; and
provide data information to the tag reader;
the RF card is configured to exchange RF data with the RF reader module through the communication link;
the tag reader, under control of the main processor module, is configured to:
determine whether the tag is within the communication range;
read the data information from the tag reader; and
transmit the data information to the main processor module;
the method further comprising:
exchanging the RF data between the RF reader module and the RF card as long as the mobile terminal is within the communication range with the RF card reader and the RF data exchange has not completed.

3. The method of claim 1, wherein the data information comprise an RF communication address of the RF card.

4. The method of claim 1, wherein the tag is disposed over an outer surface of the mobile terminal.

5. The method of claim 1, wherein the tag comprises an RF identification (RFID), and wherein the RF card reader comprises an RFID reader.

6. The method of claim 1, wherein the tag comprises a bar code, and wherein the RF card reader comprises a bar code reader.

7. The method of claim 1, wherein the tag comprises a contactless smart card, and wherein the RF card reader comprises a contactless smart card reader.

8. The method of claim 1, wherein the communication link is an RF link in super high frequency (SHF), very high frequency (VHF), or ultra high frequency (UHF) bands, and wherein a range of the RF link is limited by a range for the RF card reader to read the data from the tag.

9. The method of claim 1, wherein the RF card comprises an RF subscriber identification module (SIM).

10. A communication system comprising:
   a radio frequency (RF) card reader that comprises:
      a tag reader to read data information from the tag;
      an RF reader module; and
      a main processor module; and
   a mobile terminal that comprises:
      an RF card to communicate and exchange RF data with the RF card reader; and
      a tag to determine a communication range between the RF card reader and the mobile terminal, and to provide the data information to the tag reader of the RF card reader,
   wherein:
      the tag reader, under control of the main processor module, is configured to:
         determine whether the tag is within the communication range;
         read the data information from the tag when the tag is within the communication range;
         transmit the data information to the main processor module; and
         intermittently detect whether the tag is within the communication range after a communication link is established between the RF reader module and the RF card and during the RF data exchange between the RF reader module and the RF card,
      the RF reader module, under the control of the main processor module, is configured to establish the communication link and exchange the RF data with the RF card; and
      the main processor module is configured to disconnect the communication link between the RF reader module and the RF card when the tag is not within the communication range with the RF card reader or when the RF data exchange has completed.

11. The communication system of claim 10, wherein the main processor module is further configured to determine whether the RF data exchange is completed.

12. The communication system of claim 10, wherein the RF card comprises:
   a central processing unit;
   an RF antenna, through which the RF card establishes a communication link with the RF reader module;
   RF transceiver circuitry electrically coupled to the RF antenna;
   interface circuitry, controlled by the central processing unit, to link peripheral apparatuses; and
   RF card storage, controlled by the central processor unit, to store the RF data.

13. The communication system of claim 10, wherein the tag comprises at least one of an RF identification (RFID), a bar code, or a contactless smart card.

14. The communication method of claim 10, wherein the RF card comprises an RF subscriber identification module (SIM) card.

15. The communication method of claim 14, wherein the communication range between the RF card reader and the mobile terminal is a communication range in super high frequency (SHF), very high frequency (VHF), or ultra high frequency (UHF) bands.

16. A radio frequency (RF) card reader for communicating with a mobile terminal that comprises an RF card and a tag, wherein:
   the RF card reader comprises:
      a tag reader to read the data from the tag;
      an RF reader module;
      a main processor module; and
      an interface module to connect the RF card reader with peripheral apparatuses;
   the tag reader, under control of the main processor module, is configured to:
      determine whether the tag is within the communication range;
      read the data information from the tag reader if the tag is within the communication range;
      transmit the data information to the main processor module; and
      intermittently detect whether the tag is within the communication range after a communication link is established between the RF reader module and the RF card and during the RF data exchange between the RF reader module and the RF card,
   the RF reader module, under the control of the main processor module, is configured to establish a communication link and exchange RF data with the RF card; and
   the main processor module is configured to disconnect the communication link between the RF reader module and the RF card when the tag is not within the communication range with the RF card reader or when the RF data exchange has completed.

17. The RF card reader of claim 16, wherein the main processor module is further configured to determine whether the RF data exchange is completed.

18. The RF card reader of claim 16, wherein the RF reader module functions in super high frequency (SHF), very high frequency (VHF), or ultra high frequency (UHF) bands.

* * * * *

UNITED STATES PATENT AND TRADEMARK OFFICE
CERTIFICATE OF CORRECTION

PATENT NO.       : 8,704,641 B2
APPLICATION NO. : 13/059620
DATED            : April 22, 2014
INVENTOR(S)      : Shan Zhu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 498 days.

Signed and Sealed this
Twenty-ninth Day of September, 2015

Michelle K. Lee
*Director of the United States Patent and Trademark Office*